US006887445B2

(12) United States Patent
Braga et al.

(10) Patent No.: US 6,887,445 B2
(45) Date of Patent: May 3, 2005

(54) PROCESS FOR SULFUR SCAVENGING

(75) Inventors: Thomas G. Braga, St. Louis, MO (US); Delbert C. Scranton, Jr., Chesterfield, MO (US)

(73) Assignee: M-I L.L.C., Houston, TX (US)

( * ) Notice: Subject to any disclaimer, the term of this patent is extended or adjusted under 35 U.S.C. 154(b) by 377 days.

(21) Appl. No.: 09/683,988

(22) Filed: Mar. 8, 2002

(65) Prior Publication Data

US 2002/0182135 A1 Dec. 5, 2002

Related U.S. Application Data

(60) Continuation-in-part of application No. 09/882,156, filed on Jun. 15, 2001, now Pat. No. 6,703,341, which is a division of application No. 09/129,208, filed on Aug. 4, 1998, now Pat. No. 6,251,348.

(51) Int. Cl.$^7$ ................................................ C01B 7/00
(52) U.S. Cl. ................................................ 423/244.06
(58) Field of Search ........................ 423/244.06, 244.1

(56) References Cited

U.S. PATENT DOCUMENTS

| | | | |
|---|---|---|---|
| 3,660,276 A | 5/1972 | Lacey | |
| 3,832,445 A | 8/1974 | Kouwenhoven et al. | |
| 3,907,666 A | 9/1975 | Chun et al. | |
| 4,014,982 A | * 3/1977 | Paull et al. | 423/528 |
| 4,113,606 A | 9/1978 | Mulaskey | |
| 4,149,997 A | 4/1979 | Araki et al. | |
| 4,163,043 A | 7/1979 | Dezael et al. | |
| 4,187,282 A | 2/1980 | Matsuda et al. | |
| 4,246,244 A | 1/1981 | Fox | |
| 4,251,495 A | 2/1981 | Deschamps et al. | |
| 4,310,497 A | 1/1982 | Deschamps et al. | |
| 4,344,842 A | 8/1982 | Fox | |
| 4,366,131 A | 12/1982 | Fox | |
| 4,455,286 A | 6/1984 | Young et al. | |
| 4,550,098 A | 10/1985 | Gens | |
| 4,593,148 A | 6/1986 | Johnson et al. | |
| 4,634,539 A | 1/1987 | Fox et al. | |
| 4,690,806 A | 9/1987 | Schorfheide | |
| 4,695,366 A | 9/1987 | Miller et al. | |
| 4,722,799 A | 2/1988 | Ashbrook et al. | |
| 4,729,889 A | 3/1988 | Flytani-Stephanopoulos et al. | |
| 4,871,710 A | 10/1989 | Denny et al. | |
| 4,939,113 A | 7/1990 | Tauster et al. | |
| 4,959,202 A | 9/1990 | Minet et al. | |
| 4,983,367 A | 1/1991 | Denny et al. | |
| 4,990,318 A | 2/1991 | Kidd | |
| 4,996,181 A | 2/1991 | Denny et al. | |
| 5,147,620 A | 9/1992 | Rozsa | |
| 5,227,351 A | 7/1993 | Gasper-Galvin et al. | |
| 5,244,641 A | 9/1993 | Khare | |
| 5,447,551 A | 9/1995 | Huestis et al. | |
| 5,472,633 A | 12/1995 | Griffin, Jr. et al. | |
| 5,478,541 A | 12/1995 | Samuels et al. | |
| 5,776,331 A | 7/1998 | Khare et al. | |
| 5,792,438 A | 8/1998 | Scranton, Jr. | |
| 5,928,980 A | 7/1999 | Gangwal et al. | |
| 6,042,798 A | 3/2000 | Masuda et al. | |
| 6,126,911 A | 10/2000 | Scranton, Jr. | |
| 6,251,348 B1 * | 6/2001 | Scranton, Jr. | 423/244.01 |

FOREIGN PATENT DOCUMENTS

| | | |
|---|---|---|
| SU | 791411 | 1/1981 |
| WO | 90/14876 | 12/1990 |

OTHER PUBLICATIONS

Anerousis, John P. After more than a century, iron sponge still soaks up hydrogen sulfide problems, *Environmental Solutions*, pp. 69–73, Sep., 1994.

Author Unknown, *NACE Basic Corrosion Course Alphabetical Subject Index*, Houston:TX: National Association of Corrosion Engineers, Oct. 1978.

Fontana and Greene, *Materials Science and Engineering Series: Corrosion Engineering*, pp. 297–324, New York: McGraw Hill, 1978, no month.

Getting the details right. Sulphuric Acid Technology, *Sulphur*, Jul., 1995.

Guidelines set for handling sour gas, *Oil & Gas Journal*, Jun. 16, 1978.

Handling hydrogen sulfide in drilling fluids, part 2, *World Oil*, Dec. 1989.

Iron Sponge is economical and effective for NGL sweetening, *Oil & Gas Journal*, Sep. 23, 1985.

Iron sponge: Still a top option for sour gas sweetening, *Oil and Gas Journal*, Feb. 18, 1985.

Measurement records vital for effective program, *Oil & Gas Journal*, Jul. 9, 1990.

Rounding Up Sulfur, *Chemical Engineering*, Feb., 1995.

Sieves replaced by DEA system in gas plant to boost ethane recovery, *Oil & Gas Journal*, Oct. 20, 1986.

* cited by examiner

*Primary Examiner*—Stanley S. Silverman
*Assistant Examiner*—Edward M. Johnson
(74) *Attorney, Agent, or Firm*—Thompson Coburn LLP

(57) ABSTRACT

In ridding fluids, including hydrocarbon fluids, both gaseous and liquid, of sulfur compounds including hydrogen sulfide, oxides of sulfur, and thiols, the present invention uses a small quantity of an activator, generally a noble metal oxide, preferably a copper species and/or a manganese species, along with a known oxide product, such as iron oxide, iron hydroxide, zinc oxide, zinc hydroxide, manganese oxide, manganese hydroxide, or combinations thereof, to thoroughly remove sulfur contaminants in a short amount of time. The activator allows for the use of smaller reactor vessels and the production of hydrocarbon fluids substantially free of sulfur products.

3 Claims, 3 Drawing Sheets

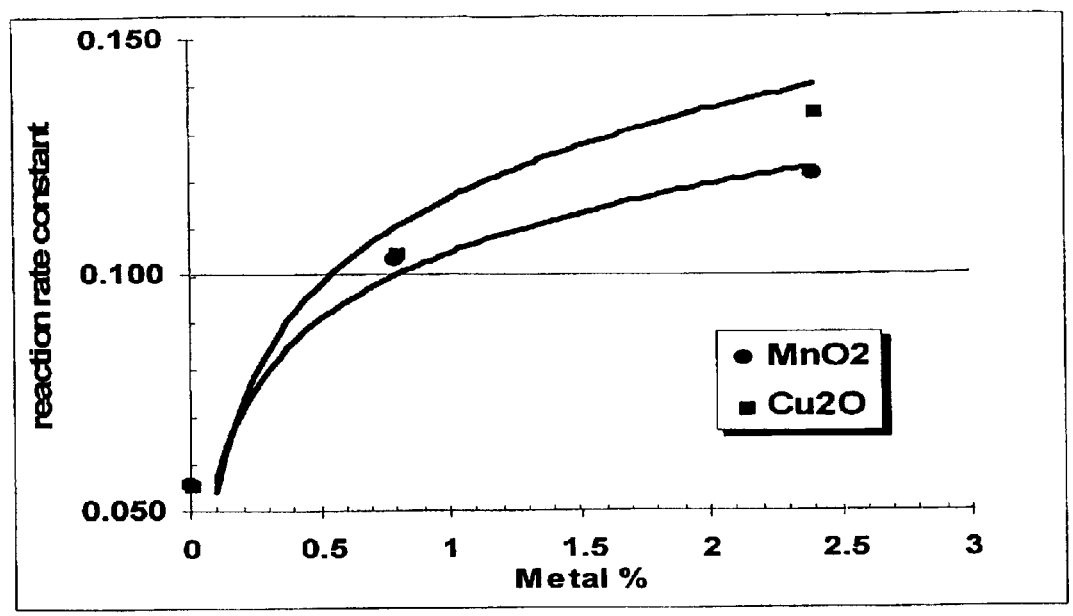
Figure 2: Comparison of metal activators under aerobic conditions
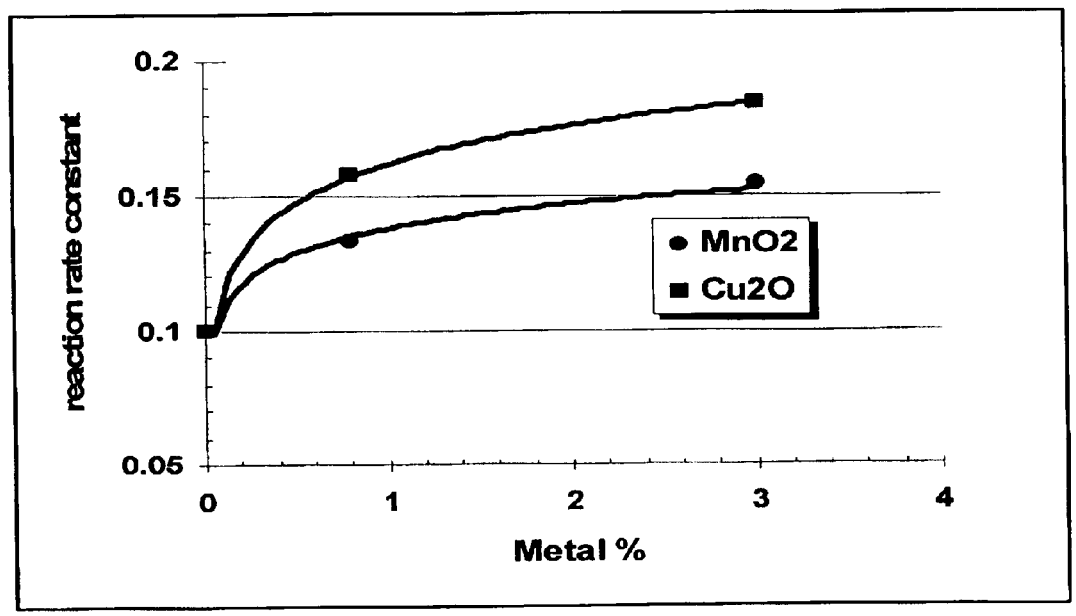
Figure 3: Comparison of metal activators under anerobic conditions

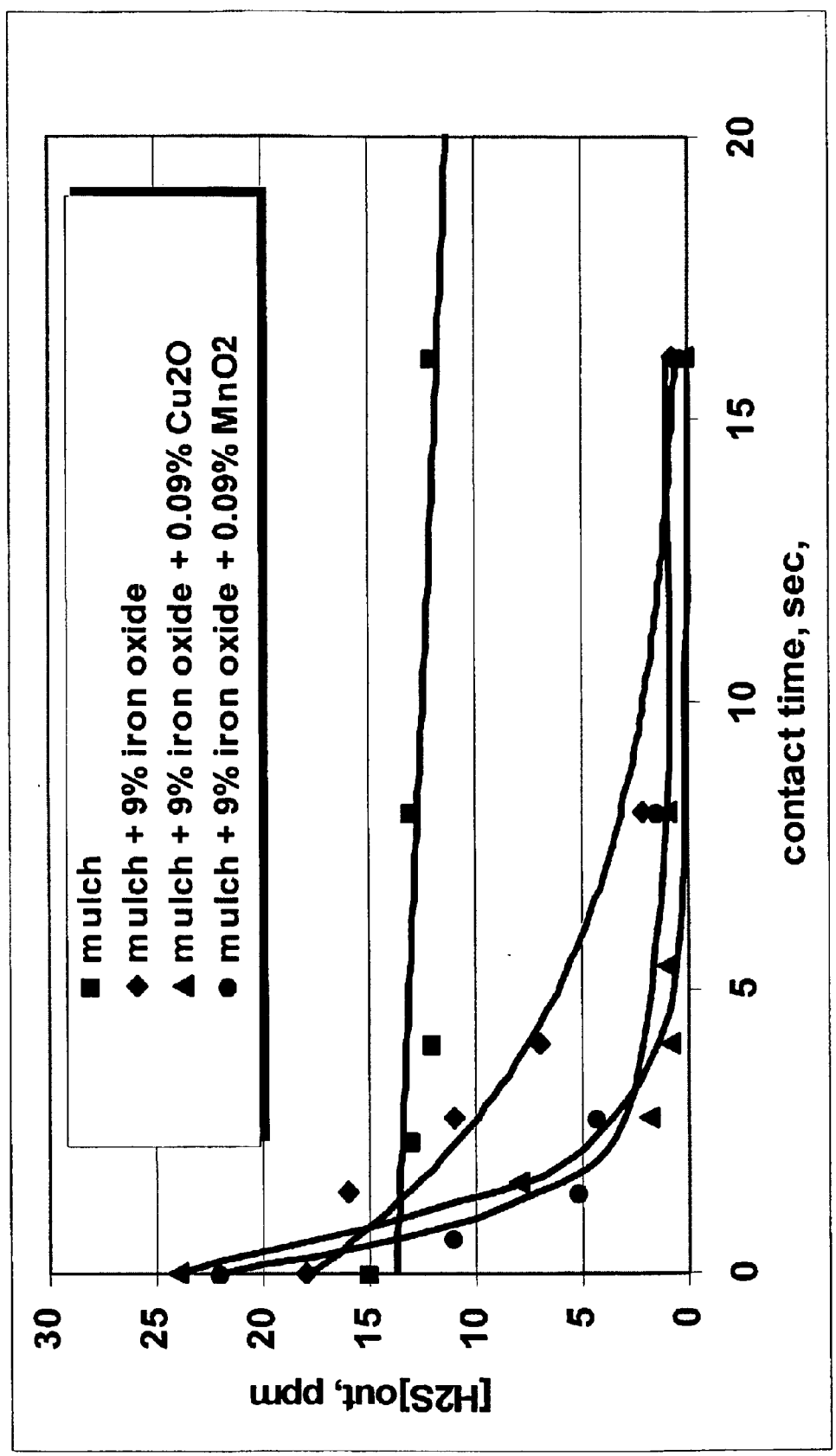
Figure 4 Comparison of $MnO_2$ and $Cu_2O$ as activator

PROCESS FOR SULFUR SCAVENGING

CROSS REFERENCE TO RELATED APPLICATIONS

This application is a continuation-in-part of U.S. patent application Ser. No. 09/882,156, filed on Jun. 15, 2001, which is a divisional of Ser. No. 09/129,208, now U.S. Pat. No. 6,251,348, filed on Aug. 4, 1998, and issued on Jun. 26, 2001.

FIELD OF INVENTION

This invention relates to the activation of oxide products that are reactant with sulfur compounds, wherein the activated oxide products sweeten fluids, both gases and liquids, contaminated with sulfur-bearing compounds such as hydrogen sulfide and thiols (mercaptans). Preferably, this invention relates to improving the removal of sulfur compounds from hydrocarbon streams by adding an activator to an iron oxide product which increases the rate of reactivity of the iron oxide product with the sulfur compounds found in hydrocarbon streams.

BACKGROUND OF INVENTION

Oxides, particularly iron oxides, supported on inert particulate matter have long been used in flow-through packed-bed processes to react with and scavenge hydrogen sulfide and thiols (mercaptans) present in natural gases and liquid hydrocarbons. The reactions between oxides and sulfides traditionally have been relatively slow, as compared to other sulfur removal or gas sweetening systems. Because of the slow rate of reaction, large iron oxide beds contained in large reactor vessels have been required in order to adequately remove hydrogen sulfide and thiols from the hydrocarbon fluids. The larger reaction vessels allow for longer contact times between the oxides and the sulfur compounds, with the longer contact times being necessary to adequately remove the sulfur compounds. A somewhat offsetting advantage to the slowness and size requirements of the iron oxide beds is that the reacted iron oxide bed material may be disposed of as non-toxic waste, unlike some other sulfur removal processes which require toxic waste disposal systems.

Current iron oxide based products designed to remove sulfur compounds from gas or vapor streams have performance limitations. An example of such a performance limitation relates to the minimum hydrocarbon fluid or gas residence time in a reactor vessel, as the residence time required for the gas in the vessel limits the space and practical vessel size in some cases. Minimum gas exposure or retention time in low pressure iron oxide beds typically ranges between about 1 to about 1.3 minutes based on the amount of unoccupied bed space and actual gas volume. Thus, large diameter vessels and beds are typically required for efficient design common in low pressure iron oxide bed applications. Large diameter vessels are also required in high pressure oxide processes, and, like low pressure iron oxide beds, are very expensive. Because of the lengthy gas retention time, it is difficult to fit vessel sizes into small foot print applications like offshore drilling or limited space plant facilities. Consequently, a problem exists because small vessel sizes cannot be used to sweeten hydrocarbon fluids, meaning certain facilities do not have access to packed bed iron oxide processes. Because of the space limitation, it would be desirable to have an iron oxide bed that required less space, preferably about half of the cross sectional area normally required, and was still capable of sweetening hydrocarbon fluids.

Unplanned increases in gas volumes and inlet hydrogen sulfide levels, beyond the design capacity of normal iron oxide beds, cause under-utilization of the iron oxide product and excessive costs. Iron oxide systems that are properly designed initially can experience increased gas flow and/or higher levels of hydrogen sulfide that significantly exceed normal design conditions resulting in inefficient utilization of iron oxide type products and substantially higher operating costs. Because unplanned increases in volume frequently occur, it is desirable to have a product and process that can handle increases in volume without wasting the iron oxide product.

An additional problem involves hydrocarbon fluids, gas and liquid, that are less than totally water saturated, as the unsaturated hydrocarbon fluids require long contact times to effectively remove hydrogen sulfide. Also, systems designed for water saturated conditions operate inefficiently when the fluid is not water saturated. Natural gas and vapor, and liquid hydrocarbon streams that are less than totally water saturated will result in the decreased removal efficiency of hydrogen sulfide by the iron oxide product and higher operating costs. Thus, a problem exists because current iron oxide products are commercially efficient only in the removal of dissolved hydrogen sulfide or other sulfur compounds in hydrocarbon fluids if there is sufficient contact time and the hydrocarbon fluids are saturated. Often, however, it is not practical to inject water to fully saturate the hydrocarbon fluid to achieve normal hydrogen sulfide removal. Consequently, it is desirable to have a system for sweetening hydrocarbon fluids that does not require the hydrocarbon fluids to be totally water saturated.

Systems designed to control odors in vapors from wastewater and oil tanker vent scrubber systems often utilize blowers and pressure boosters that create unsaturated gas or vapor streams by changing the physical properties of the hydrocarbon fluids. These operational practices can reduce the efficiency of iron oxide products in removing hydrogen sulfide and other sulfur compounds from fluids. Thus, it is desirable to have a system that can remove hydrogen sulfide and other sulfur compounds from gas and vapor streams that have constantly changing physical properties.

Additionally, some systems may inject air into the hydrocarbon fluid. The injection of air, which includes oxygen, causes increased corrosion and safety concerns despite increased capacity for hydrogen sulfide removal. The intentional and unintentional inclusion of air, including oxygen, in natural gas or vapor streams has long been seen to increase the capacity of iron oxide impregnated wood chips and other oxide products to react with hydrogen sulfide. However, corrosion and safety concerns are greatly increased due to the presence of oxygen, which will react with the vessel containing the oxide product. Also, many natural gas contracts presently specifically limit the amount of oxygen in the gas and some contracts prohibit the intentional injection of air due to problems caused downstream in gas transportation systems. The inclusion of a "non-oxidizer" stimulant or activator in the iron oxide product that enhances the capacity of sulfur removal, without the associated problems of organic and inorganic oxidizers, like air, would enhance the use of oxide products in sulfur removal processes.

Liquid hydrocarbons commonly include dissolved hydrogen sulfide and other sulfur compounds. In some cases, the hydrogen sulfide removal sufficiently meets the required product quality for sales to pipelines and transporters. Frequently, however, other sulfur compounds, such as mercaptans, carbonyl sulfides, and carbon disulfide need to be removed to meet required sulfur limits and product quality tests before the hydrocarbons can be sold. An improved iron oxide product that would efficiently remove hydrogen sulfide and other sulfur compounds to meet required sulfur limitations in hydrocarbon fluids would significantly increase the commercial utility of iron oxide sulfur removal processes.

Thus, it is desirable to have an iron oxide bed process and composition that functions in a small reactor vessel, removes sulfur compounds in a short amount of time, removes sulfur compounds from unsaturated fluids, does not require the injection of air, and removes most if not all of the sulfur compounds in a fluid, particularly a hydrocarbon fluid. As will be seen, the present invention activates the oxide bed process and composition to meet the above listed criteria.

SUMMARY OF INVENTION

The present invention relates to the use of an activator in an oxide product reactant with sulfur compounds. The activator increases the rate of reactivity of the oxide product with sulfur compounds contained in fluids. Preferably, the activator will have a higher electro-potential than the oxide product so that when the activator is coupled with the oxide product, the coupling will result in an increase in the reactivity of the oxide product with sulfur compounds contained in fluids. Importantly, the activator increases the rate of reactivity of the oxide product without requiring high temperatures to help increase the rate of reactivity or the addition of air, oxygen in particular. The activator causes increased reactivity at a temperature equal to or less than 300° C. Additionally, when the oxide product and the activator are coupled, the oxide product can remove sulfur compounds, including oxides of sulfur, hydrogen sulfide, and thiols, from fluids including saturated and unsaturated fluids, as well as liquid, gas, or a combination thereof, and not just hydrocarbon fluids.

Typically, the activator is a noble metal oxide and the oxide product is an iron oxide, iron hydroxide, zinc oxide, zinc hydroxide, manganese oxide or manganese hydroxide product, and combinations thereof. Preferred embodiments of the activator involves the use of small amounts of copper, including copper metal and copper oxide, either cuprous or cupric, and/or manganese, including manganese metal and manganese oxide, added to a conventionally made sulfide reactant oxide-bed, such as an iron oxide bed. An example of such an iron oxide bed used for hydrogen sulfide removal is found in U.S. Pat. No. 5,320,992. The copper and/or manganese activator reacts with the iron oxide product in the iron oxide bed to increase the rate of reactivity of the iron oxide product with sulfur compounds found in fluids, including hydrocarbon fluids. The increased reactivity of the iron oxide product caused by the copper and/or manganese activator results in the completion of the sulfur compound removal reaction in less than half the time of a normal sulfur removal reaction, making feasible the use of iron oxide beds equal to half, or less, the volume than conventional beds. This unexpected result is believed to be due to the substantially higher electro-potential of the copper or manganese as compared to the iron oxides. Additionally, the use of limited amounts of copper and/or manganese activator will prevent the exhausted bed from being rated as a hazardous waste by the current standards promulgated by the Environmental Protection Agency.

Metal oxides, such as iron oxide, iron hydroxide, zinc oxide, zinc hydroxide, manganese oxide, and manganese hydroxide have an electronegative potential, meaning the potential is on the active or anodic end of the Emf series, with the active end relating to metals which tend to corrode. Nobel metal oxides, copper for example, have an electropositive potential, meaning the potential is on the noble or cathodic end of the Emf series. Cathodic metals do not readily corrode. The Emf series is a listing of elements according to their standard electrode potential. When two dissimilar metals are combined, increasing the electropotential, a galvanic cell is formed, which will result in galvanic corrosion. Corrosion of a metal is increased because of the current caused in a galvanic cell, so that as the corrosion rate is increased, so is the reactivity of the metal. When copper, for example, is added to iron oxide, for example, a galvanic cell is formed which causes the iron oxide to corrode faster and thus be more reactive with various sulfur species. Also, when a manganese activator is added to a metal oxide, including iron oxide, iron hydroxide, zinc oxide and zinc hydroxide a galvanic cell will form. Manganese has an electronegative potential which is less negative than the electronegative potential found in iron oxide, iron hydroxide, zinc oxide and zinc hydroxide. Therefore, by using manganese as the activator, the electropotential is increased, thereby forming a galvanic cell so that corrosion is increased and reactivity with various sulfur species is increased. ("Basic Corrosion Course, 1978").

According to another aspect of the present invention, even when the hydrogen sulfide-tainted fluids include thiols, mercaptans in particular, offensive odors are completely eliminated along with a reduction of total sulfur content to levels acceptable to commercial purchasers. Another aspect of the invention is that hydrocarbon fluids do not have to be saturated in order to have the oxide product, coupled with an activator, adequately remove thiols (mercaptans).

Because the inventive activator effectively raises the rate of reactivity of oxide products, this invention results in the improvement in the use of disposable oxide products for the removal of sulfur compounds from natural gas and vapors, and other hydrocarbon liquids. Thus, the present invention is desirable because it allows for an oxide product that can be contained in a small reactor vessel, results in the removal of sulfur compounds in a short amount of time, allows for the removal of sulfur compounds from unsaturated hydrocarbon fluids, the non-inclusion of air, and the thorough removal of the sulfur compounds from fluids.

BRIEF DESCRIPTION OF DRAWINGS

FIG. 2 is a graph comparing manganese oxide versus copper oxide as activators for the iron oxide product.

FIG. 3 is a graph comparing the reaction rate of manganese oxide versus copper oxide as activators for the iron oxide product in aerobic conditions, as found in Example 2; and FIG. 4 is a graph comparing the reaction rate of manganese oxide versus copper oxide as activators for the iron oxide product in anaerobic conditions, as found in Example 3.

DETAILED DESCRIPTION

Figure 1:
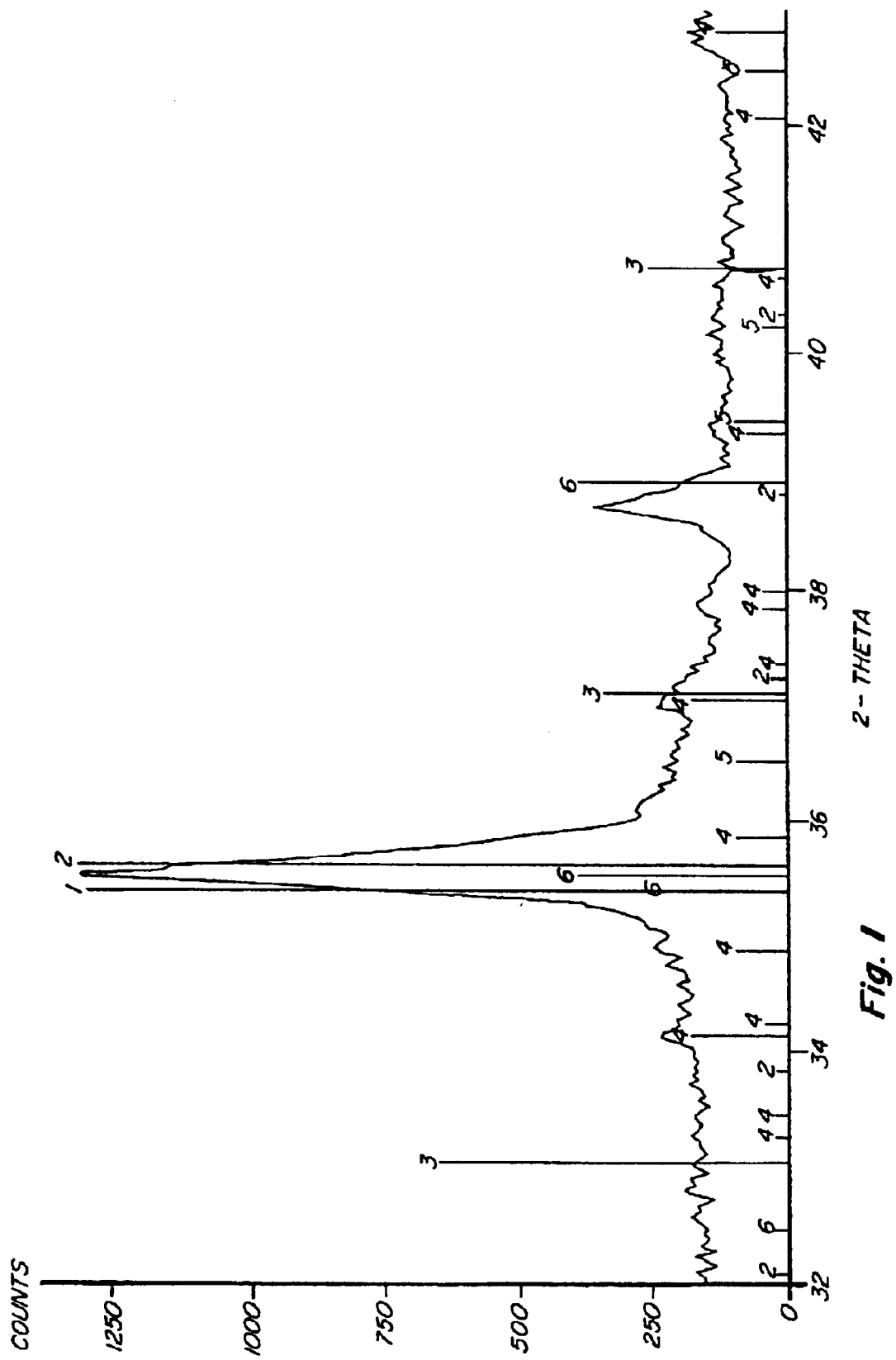
FIG. 1 is an X-ray diffraction reading showing the presence of copper oxide after having hydrogen sulfide pass through an iron oxide product.

In accordance with the present invention, an activation method and composition are provided for increasing the reactivity of oxide products, preferably iron oxide, iron hydroxide, zinc oxide, zinc hydroxide, manganese oxide, manganese hydroxide, and combinations thereof, with sulfur compounds in contaminated fluids, including gas, liquid, or a combination thereof, resulting in the removal of the sulfur compounds from the fluids. The oxide products that react with sulfur compounds are also known as sulfide reactant oxides. The process is initiated by adding an activator composition, preferably a noble metal oxide, to the iron oxide product, preferably a packed-bed iron oxide product. The noble metal oxide activator will react with the iron oxide product to increase the reactivity of the iron oxide product with sulfur compounds. The reaction between the activator and iron oxide product causes the iron oxide product to more readily react with sulfur compounds, such as thiols, oxides of sulfur, and hydrogen sulfide ($H_2S$), resulting in the removal of the sulfur compounds from various fluids. Preferably, the sulfur compounds are removed from the hydrocarbon fluids so that upon removal of the sulfur compounds, the hydrocarbon fluids can be used for commercial purposes.

The process, as stated, involves adding an activator to a metal oxide product. The metal oxide product is comprised of iron oxide, iron hydroxide, zinc oxide, zinc hydroxide, manganese oxide, manganese hydroxide, and combinations thereof. The metal oxide product is reactant with sulfur compounds, with the activator reacting with and activating the metal oxide product. The activator increases the reactivity of the metal oxide product with sulfur compounds, which can be found in hydrocarbon fluids. The activator may be selected from the noble metal oxides, which includes, but is not limited to, platinum oxides, gold oxides, silver oxides, copper oxides, copper metals, copper carbonates, copper salts, copper alloys, cadmium oxides, nickel oxides, palladium oxides, lead oxides, mercury oxides, tin oxides, manganese oxides, manganese carbonates, manganese metals, manganese salts, manganese alloys, cobalt oxides, and combinations thereof. In addition to the noble metal oxides, alloys made of noble metals and some metals may also be used. The most preferred noble metal oxides are copper oxides, either cuprous or cupric oxide, manganese oxide, and combinations thereof. The use of copper species and/or manganese species is preferred because they are readily available and meet current environmental standards, as promulgated by the Environmental Protection Agency. Suitable copper species, which can be used as an activator, include copper compounds, such as copper metals, copper oxides, copper carbonates, any copper salts, copper alloys, and combinations thereof. While suitable manganese species include manganese oxides, manganese carbonates, manganese metals, manganese salts, manganese alloys, and combinations thereof. When manganese oxide or manganese hydroxide is used as the metal oxide, an activator may be any of the noble metal oxides, with the exception of any manganese species. Regardless of the noble metal oxide selected, the activator is designed to increase the efficiency of treatment of fluids with iron oxide, iron hydroxide, zinc oxide, zinc hydroxide, manganese oxide, manganese hydroxide products, and combinations thereof. The activator will generally be of a powder grade particle size; however, the activator can have a particle size ranging between a U.S. mesh size 8 and a U.S. mesh size 325.

The activator causes increased reactivity in the iron oxide, iron hydroxide, zinc oxide, zinc hydroxide, manganese oxide, and manganese hydroxide product referred to generally throughout as the iron oxide product, because it has a higher electro-potential than the iron oxide product, with the dissimilar electro-potential causing bi-metallic coupling between the activator, copper oxide for example, and the iron oxide product. This bi-metallic coupling results in an increased rate of reaction between the iron oxide product and the sulfur compounds found in fluids, in particular hydrocarbon fluids. The activator causes the iron oxide to be more reactive by increasing the corrosion rate of the iron oxide, which causes an increased reactivity between the iron oxide product and sulfur compounds. Essentially, the activator causes the iron oxide to react with the sulfur compounds before the activator reacts with the sulfur compounds. More specifically, while copper oxide is known to react quickly with hydrogen sulfide, the reaction between the copper oxide and the hydrogen sulfide essentially takes place after the reaction of the activated iron oxide with the hydrogen sulfide, with the reaction between the copper oxide and the hydrogen sulfide continuing longer than the concentration of the activator accounts for. This is demonstrated in FIG. 1, which shows the presence of copper oxide in an iron oxide bed after having sulfur compounds pass through and react with the iron oxide bed. The presence of copper oxide is shown in FIG. 1 by line 6, with FIG. 1 being an X-ray diffraction reading taken after the activated iron oxide product had removed hydrogen sulfide from hydrocarbon gas. In particular, FIG. 1 shows that the copper oxide activated the iron oxide to react first, as the amount of hydrogen sulfide that was passed through the iron oxide bed was equal to eight (8) times more hydrogen sulfide than would be necessary to exhaust the copper oxide present in the iron oxide bed. Because the copper oxide did not completely react with the hydrogen sulfide, this indicates that the iron oxide reacted with the hydrogen sulfide before the copper oxide. In addition to coupling with and activating iron oxides, zinc oxides and manganese oxides the activator can be used to activate other oxides. These other oxides include oxides having a lower electro-potential than the activator.

An amount of activator equal to less than 1% by total weight of the iron oxide product is sufficient to increase the reactivity of the iron oxide product with the sulfur species. Thus, the addition of a small amount of the activator, such as copper oxide or manganese oxide, in combination with an iron oxide product results in a faster reaction with hydrogen sulfide, thiols (mercaptans), and other sulfur compounds, including carbonyl sulfide and carbon disulfides. In addition to increasing the reactivity of the iron oxide product, the copper oxides and manganese oxides are preferred because they are readily available and meet current environmental standards as promulgated by the Environmental Protection Agency. Finally, dependence upon fully water saturated gas or vapor streams for efficient sulfur removal is not necessary due to the higher reaction rates caused by the activator of this invention.

Use of copper oxide or manganese oxide as an activator is also desirable because they generally do not corrode the reactor vessel. When unprotected mild steel equipment, such as the reactor vessel that houses the iron oxide beds, is exposed to copper ions or manganese ions, corrosion of the steel can result. However, because a relatively small amount of noble metal oxide, preferably copper oxide or manganese oxide, is used, the reactor vessel is not significantly corroded. Reactor vessel corrosion rates are not significantly higher than current iron oxide products due to the minimal presence of copper ions or manganese ions that cause high corrosion rates.

The oxide product that reacts with sulfur is also known as a sulfide reactant oxide and is selected from a metal oxide group having a lower electro-potential than the activator.

Typically, the oxide product is an iron oxide product of the formula $Fe_xO_y$, with "x" equal to between 1 and 3, and "y" equal to between 1 and 4. Also, hydroxides of iron oxides may be used. More particularly, the iron oxide is preferably either $Fe_2O_3$, $Fe_3O_4$, or a combination thereof. Alternatives to the iron oxide product include zinc oxide, zinc hydroxide, manganese oxide, and manganese hydroxide products. Normally, the iron oxide product is combined with an inert bed material to form an iron oxide bed that is housed in a reactor vessel; but it is not necessary to combine the iron oxide product with a bed material, inert or otherwise. When the iron oxide bed is made of an inert carrier material, the iron oxide product attaches to the inert carrier material, which holds the iron oxide product in place when contacted with hydrocarbon fluids. Preferably, the inert carrier is a calcinated montmorillonite carrier, which is desirable because it is non-hazardous, stable, reliable, and easy to clean. Instead of an inert carrier, the iron oxide product can be combined with other carriers, such as water. Once the iron oxide product and carrier have been reacted with sulfur compounds, the reactant iron oxide product remains stable and non-hazardous according to currently promulgated Environmental Protection Agency and state standards.

When activated, the iron oxide product reacts with sulfur compounds to remove the sulfur compounds from fluids, including gases, liquids, vapors, and combinations thereof, as well as non-fully saturated fluids. The activated iron oxide product can remove sulfur compounds from fluids, including air streams, carbon dioxide streams, nitrogen gas, and hydrocarbon gases, liquids, and combinations thereof. The sulfur compounds that are removed from the fluids include, but are not limited to, $C_1$ to $C_3$ thiols (mercaptans), hydrogen sulfide, carbon disulfides, carbonyl sulfide, and other oxides of sulfur.

The preferred iron oxide bed composition containing the activator is comprised of a carrier equal to from about 0% to about 95% by weight of the total iron oxide bed composition, more preferably from about 0% to about 77% by weight, and even more preferably from about 59% to about 76.8% by weight. An amount of iron oxide product is added to the iron oxide bed composition equal to from about 3% to about 30% by weight of the total iron oxide bed composition, and more preferably equal to from about 5% to about 22% by weight of the total iron oxide bed composition. An amount of water can be added to the iron oxide bed composition ranging from approximately 0% to approximately 80% by weight of the total iron oxide bed composition and, more preferably, approximately 18% by weight of the total iron oxide bed composition. Finally, an activator, preferably copper oxide or manganese oxide, is added to the iron oxide bed composition in an amount equal to from about 0.125% to about 5% by weight of the total iron oxide bed composition. Preferably, the activator is used in an amount equal to from about 0.25% to about 2% by weight of the total iron oxide bed composition. Larger amounts of the activator, greater than 5% by weight, can be used; however, it is most preferred to use an amount of activator equal to approximately 1% by weight of the total iron oxide bed composition. Further, the reactor bed will preferably be maintained at a temperature equal to or less than 300° C.

An alternative embodiment would include an amount of iron oxide product equal to from about 95% to about 99.875% by weight of the total iron oxide bed composition in combination with an amount of activator equal to from about 0.125% to about 2% by weight of the total iron oxide bed composition.

Another embodiment would include the use of water as the primary carrier, with the water added in an amount equal to from about 50% to about 80% by weight of the total iron oxide bed composition, an amount of iron oxide product added to the water in an amount equal to from about 5% to about 22% by weight of the iron oxide bed composition, and an activator added to the water and iron oxide product equal to from about 0.125% to about 5% by weight of the total iron oxide bed composition. The preferred combination of activator to iron oxide product is equal to about 1 part by weight of activator to about 10 to about 50 parts by weight of iron oxide product. It should be noted that the amount of activator required is comparatively small when analyzed in view of the oxide product. This is because it takes a comparatively small amount of activator to increase the reactivity of the iron oxide product, or other oxide products.

It should be further noted that the presence of oxygen in the fluid containing sulfur compounds further increases the electro-potential differential between the oxide product and the activator. Thus, even small vessels with dramatically shorter contact times are possible for odor control applications and hydrogen sulfide removal systems with vapors naturally containing, or with the deliberate addition of, air, which may include oxygen.

In order to further illustrate the present invention, the following examples are given. However, it is to be understood that the examples are for illustrative purposes only and are not to be construed as limiting the scope of the subject invention.

EXAMPLES

Example 1

The following experiment was conducted to determine the amount of hydrogen sulfide removed from water by an iron oxide product containing manganese oxide as an activator under anaerobic conditions.

A 1.5 liter glass reaction vessel was set up with a sparge tube, pH probe, and stirrer. 900 ml of water was added to the vessel. A nitrogen sparge was used to remove any oxygen in th water. The system was then sparged with hydrogen sulfide (400 parts per million in nitrogen at a constant rate (approximately 100 ml/min.) measured with a rotometer. After 5 minutes, the hydrogen sulfide was measured in the gas phase, just above the liquid level. The results are shown in Table 1.

TABLE 1

| | Solution | pH | Hydrogen Sulfide out, ppm (Time 5 minutes) |
|---|---|---|---|
| 1 | Water | 5.4 | 400 |
| 2 | + 2% Iron oxide | 4.8 | 210 |
| 3 | + 2% Iron oxide | 4.9 | 200 |
| 4 | + 2% Iron oxide + 0.02% manganese oxide | 5.3 | 75 |
| 5 | + 0.02% manganese oxide | 5.0 | 400 |

As can be seen from Table 1, the manganese oxide is an activator for the iron oxide. The use of 2% iron oxide by itself was sufficient to decrease the amount of hydrogen sulfide by about 50% in 5 minutes to between about 210 parts per million (ppm) and 200 ppm. The addition of manganese oxide in an amount equal to 0.02% by weight of the iron oxide product to the 2% iron oxide was sufficient to decrease the amount of hydrogen sulfide by about 80% in 5 minutes to 75 ppm. The addition of manganese oxide by itself in an amount equal to 0.02% by weight of the iron oxide product did not remove any significant hydrogen sulfide within the 5 minute contact time of the test. This indicates that the manganese oxide is activating the iron oxide so that the reactivity of the iron oxide with the hydrogen sulfide is greatly increased by a small addition of manganese oxide.

Example 2

The following experiment was conducted to compare the use of manganese oxide versus copper oxide as an activator for the iron oxide product under aerobic conditions.

Samples of 800 grams (g) of calcinated montmorillonite clay (+4–16 mesh), to which iron oxide was added to equal about 20% by weight of the total product, were made. Some examples included copper oxide as the metal activator, and others used manganese oxide. The concentration of the metal activators was varied in the different samples. The performance of these samples was assessed using a 2 inch internal diameter (i.d.)×2 foot column, treating a gas mixture of 2500 ppm hydrogen sulfide and 5000 ppm oxygen, with the balance being nitrogen. Using these test results, a reaction rate constant (proportional to the reaction rate) was calculated. A comparison of the activators is shown in Table 2, and FIG. 2.

TABLE 2

| | Reaction Rate Constant | |
|---|---|---|
| % Metal Oxide Activator | With Copper Oxide ($Cu_2O$) | With Manganese Oxide ($MnO_2$) |
| 0 | 0.6 | 0.8 |
| 0.8 | 0.105 | 0.105 |
| 2.4 | 0.134 | 0.122 |

As shown by these results, the use of manganese oxide as an activator for iron oxide yields results comparable to the results achieved when copper oxide is used as an activator for iron oxide. Therefore, manganese oxide can be used as an activator for iron oxide in order to increase the rate of the removal of hydrogen sulfide in an aerobic system.

Example 3

Samples of g of calcinated montmorillonite clay (+4–16 mesh), to which iron oxide was added to equal about 20% by weight of the total product, were made, varying the metal activator copper oxide or manganese oxide, and the activator concentration. The performance of these samples was assessed using a 2 inch i.d.×2 foot column treating a gas mixture of 3000 ppm hydrogen sulfide, with the balance being nitrogen.

Using these test results, a reaction rate constant (proportional to the reaction rate) was calculated. A comparison of the activators is shown in Table 3 and FIG. 3.

TABLE 3

| | Reaction Rate Constant | |
|---|---|---|
| | Reaction Rate Constant | |
| % Metal Oxide Activator | With Copper Oxide ($Cu_2O$) | With Manganese Oxide ($MnO_2$) |
| 0 | 0.10 | 0.10 |
| 0.8 | 0.158 | 0.133 |
| 3.0 | 0.184 | 0.154 |

The results indicate manganese oxide is an activator for iron oxide for the removal of hydrogen sulfide in an anerobic system.

Example 4

Using the column tests described above, two pressed products were tested using 3000 ppm hydrogen sulfide in nitrogen. One was 100% by weight iron oxide and the other was 95% iron oxide and 5% manganese oxide. The results are shown in Table 4.

TABLE 4

| Product | Bad Life, Days |
|---|---|
| 100% Iron Oxide | 128 |
| 95% Iron Oxide + 5% Manganese Oxide | 144 |

These results show manganese oxide is an activator for iron oxide for the removal of hydrogen sulfide. The use of the manganese oxide activator increased the bed life of the iron oxide by more than two weeks.

Example 5

The following experiment was conducted to determine if small amounts of cuprous oxide behave as an activator for manganese oxide formulations as it does for iron oxide formulations. Two products were made using the compositions listed in Table 5 below:

TABLE 5

| Component | % by Weight Manganese Dioxide | % by Weight Manganese Dioxide/ Cuprous Oxide Activator |
|---|---|---|
| Menthionlonite Clay | 64.1 | 63.6 |
| $MnO_2$ | 24.3 | 24.1 |
| Water | 11.6 | 11.5 |
| $CuO_2$ | 0.0 | 0.8 |

These formulations are identical, except that one contains the cuprous oxide activator.

A standard baseline performance test was run on each of the formulations in a side-by-side test. Two samples of 800 g of calcinated montmorillonite clay (+4–16 mesh), to which manganese dioxide was added to equal about 24% by weight of the total product were made. One sample contained only the manganese dioxide. The other sample contained a cuprous oxide activator in the amount of about 0.8% of the total product in addition to the manganese dioxide. The performance of these samples was assessed using a 2 inch i.d.×2 foot column, treating a gas mixture of 3000 ppm $H_2S$ in $N_2$. The flow rate of the samples was 270 ml/min. The pressure in the column was 5 psig, the temperature was 70° F. to 75° F., and the column was water saturated.

The results, as shown in Table 6, indicate that the cuprous oxide containing formulation removes more hydrogen sulfide and, therefore, the cuprous oxide is an activator for manganese oxide formulations.

TABLE 6

| Formulation | Bad Life, Days |
|---|---|
| Manganese Dioxide ziose | 29 |
| Manganese Oxide/Cuprous Oxide Activator | 40 |

Example 6

As will be shown in the following example, smaller-sized reactor vessels can be used for hydrogen sulfide and other sulfur species removal, including thiols (mercaptans), from gaseous and liquid hydrocarbons by adding a small amount of copper oxide activator to an iron oxide based reaction bed contained in a steel reactor vessel.

Hydrocarbon gas samples were filtered in a reactor vessel, which was 8 feet in length and had a diameter of 2 inches. The vessel contained 10 pounds of an experimental iron oxide mix, which contained about 5.921 pounds of an inert carrier, with the carrier being a calcinated montmorillonite carrier, an amount of iron oxide powder equal to approximately 2.15 pounds, and an amount of water equal to approximately 1.9 pounds. Five (5) batches were made of the iron oxide mix, so that five (5) different tests could be conducted in the reactor vessel. Each of the five tests were initiated by passing nitrogen/carbon dioxide gas contaminated with hydrogen sulfide, the amount of hydrogen sulfide contained in the contaminated gas is listed below, through the iron oxide mix contained in the reactor vessel. In three of the tests, copper oxide was added to the iron oxide mix, the amount of which is listed below. In two of the tests, no copper oxide was added to the iron oxide mix. Also, the tests were conducted on different amounts of hydrogen sulfide ($H_2S$) contaminant contained in nitrogen/carbon dioxide gas. Additionally, some nitrogen/carbon dioxide gas samples contained oxygen, the amount of which is listed below. Thus, the nitrogen/carbon dioxide samples that were tested, included samples with oxygen and without oxygen.

The amount of copper oxide activator added to the iron oxide bed was equal to about 19 or less by weight of the total bed composition. The actual amount of copper oxide added wa about 1% by weight of the total bed composition, or an amount equal to about 0.1 pounds, and about 0.25% by weight of the total bed composition, or about 0.025 pounds. The specifi parameters for each test are listed in the table below. The conditions in the reactor vessel in which the tests were conducted are as follows:

TABLE 7

| Test Conditions | |
|---|---|
| Temperature | 70° F. |
| Flow Rate of Natural Gas Containing $H_2S$ | 5.41 liters/minute |
| Pressure | 0.5 psig |
| Bed Height | 7.9 feet (ft.) |

Contact time for the gas in the test unit was about 50 seconds at the above listed pressure, temperature, and flow rate. The gas was filtered through the reactor vessel containing the iron oxide mix. As can be seen in Table 8 below, a comparison was made between the efficiency of removal of the iron oxide mix without an activator and the iron oxide mix with the activator, copper oxide. The tests were also broken into nitrogen/carbon dioxide gas samples containing moderate amounts and extreme amounts of $H_2S$. The extreme $H_2S$ contaminated nitrogen/carbon dioxide gas was filtered through an iron oxide mix without an activator, an iron oxide mix containing 1.0% by weight of activator, and an iron oxide mix containing 0.25% by weight of an activator.

TABLE 8

| | Moderate H—S Contamination | | Extreme H—S Contamination | | |
|---|---|---|---|---|---|
| Gas Composition | $H_2S$<br>No Oxygen<br>Carbon Dioxide | 500 ppm in $N_2$<br><br>14% by volume | $H_2S$<br>Oxygen<br>Carbon Dioxide | 2200 ppm in $H_2$<br>4% by volume<br>14% by volume | |
| Test Results | Iron Oxide Only | 1% by wt | Iron Oxide Only | Copper Oxide | |
| Bed Depth for Complete $H_2S$ Removal | Greater than 7.9 feet | Copper Oxide<br>Less than<br>4.7 feet | Greater than 7.9 feet | 1.0% by wt<br>Less than<br>2.7 feet | 0.25% by wt<br>Less than<br>3.7 feet |

Measurements were taken by SENSIDYNE® hydrogen sulfide and total mercaptan stain tubes manufactured by Sensidyne, Inc.

As can be seen, in the moderately contaminated gas, the addition of a small amount of copper oxide activator substantially decreased the iron oxide bed depth required for complete hydrogen sulfide removal. The iron oxide bed with an activator required 3.2 fewer feet to remove the sulfur compounds than the iron oxide bed without an activator. In the extreme contaminated gas, the activated iron oxide bed required less than half the amount of material, 3.7 feet as compared to 7.9 feet, to remove the sulfur compounds. Furthermore, as can be seen, an increased amount of activator increases the reactivity of the iron oxide. The iron oxide mix having 1% by weight of an activator added thereto only required 2.7 feet to remove the hydrogen sulfide; whereas the iron oxide mix containing 0.25% by weight of an activator added thereto required less than 3.7 feet to remove the hydrogen sulfide. A lesser amount of iron oxide mix was required to remove the hydrogen sulfide from gas extremely contaminated with $H_2S$ as compared to gas moderately contaminated with $H_2S$. The reason there was better removal in the gas with extreme hydrogen sulfide contamination, as compared to the gas with moderate hydrogen sulfide contamination, was the addition of oxygen to the gas. This shows that oxygen further increases the reactivity of the iron oxide product when an activator is added thereto. It should be pointed out that the addition of the oxygen did not increase the reactivity of the iron oxide product without an activator.

Thus, the above example demonstrates that the use of an activator results in the ability to use a smaller bed and vessel. The example also demonstrates that the iron oxide product has increased activity when exposed to an amount of oxygen in combination with an activator.

Example 7

The following experiment was conducted to determine the amount of dissolved hydrogen sulfide and mercaptans removed from natural gas liquids (NGL) by an iron oxide product composition containing an activator. The removal of hydrogen sulfide and mercaptans from natural gas liquids is indicated by the reduction of the hydrogen sulfide and mercaptan concentrations measured in the vapor or "headspace" adjacent to the liquid.

Two tests were conducted in two (2) reactor vessels that were 4 feet high. For each test, each reactor vessel contained approximately 40 pounds of reaction material, including about 23.684 pounds of solid inert carrier, a montmorillonite carrier, about 7.6 pounds of water, and about 8.6 pounds of iron oxide powder. In one test, approximately 0.4 pounds of copper oxide was added to the reaction material, while the other test did not have any copper oxide added to the reaction material.

The test conditions were as follows:

Natural Gas Liquids (NGL) 72 API (density) at 70° F.

Headspace $H_2S$ Untreated=>4,000 (ppm)

Headspace Mercaptans Untreated—The mercaptan content could not be determined due to high $H_2S$ levels Flow Rate set at 2' equivalent unoccupied bed rising velocity. Measurements were taken by SENSIDYNE® hydrogen sulfide and total mercaptan stain tubes manufactured by Sensidyne, Inc.

Test results, as indicated by headspace concentration measurements, were as follows:

TABLE 9

| | Iron Oxide Only | Iron Oxide with 1% by wt. Copper Oxide | | | |
|---|---|---|---|---|---|
| | At 4 ft. level | At 4 ft. level | | At 8 ft. level | |
| Hours in Test | $H_2S$ | $H_2S$ | Total Mercaptans | $H_2S$ | Total Mercaptans |
| At Start | 400 ppm* | 0 ppm | 0 ppm | 0 ppm | 0 ppm |
| 6 Hr of Flow | * | 0 ppm | 35 ppm | 0 ppm | 0 ppm |
| 21 Hr of Flow | * | 0 ppm | 40 ppm** | 0 ppm | 0 ppm |

*The test was terminated due to the high amount of hydrogen sulfide, greater than 400 ppm, remaining in the headspace of the liquid hydrocarbon.
**Insignificant increase in mercaptan levels indicate maximum concentration has been reached.

The liquid hydrocarbon quality was excellent (clear yellow NGL) coming out of the unit(s) loaded with the copper oxide activator and the iron oxide product without the need for further processing. Conversely, the iron oxide product that did not have an activator did not result in sufficient removal of the hydrogen sulfide or mercaptans. Additionally, it should be pointed out that the iron oxide bed at the 8 foot level did not contain any detectable sulfur compounds. This means that the sulfur compounds were removed from the hydrocarbon fluid prior to contacting the iron oxide product at the 8 foot level.

Accordingly, use of the present invention affords at least these significant advantages: increases speed of reactivity permits the use of much smaller beds of reactive materials; and, when mercaptans and/or hydrogen sulfide are present in liquid hydrocarbons, the products of the reaction are no longer contaminated with these sulfur compounds.

Example 8

Two reactor vessels were prepared that were each 15 feet in length and each reactor vessel contained approximately 30 pounds of iron oxide mix. The iron oxide mix contained about 17.763 pounds of carrier, about 5.7 pounds of water, about 6.45 pounds of iron oxide product, and about 0.087 pounds of copper oxide. The reactor vessel was connected to a carbon dioxide gas source. The carbon dioxide gas, before passage into the reactor, was water saturated through a bubbler and filtered in the reactor under the following conditions:

Flow Rate (ft³/hr) 30

Temperature (° F.) 70

Pressure (psig) 400

Bed Height (ft) 30

Inlet $H_2S$ (ppm) 25

Inlet Mercaptans (ppm) 20

The inlet gas contained a number of other sulfur species, in addition to mercaptans and hydrogen sulfide, the most abundant sulfur compounds being methyl and ethyl sulfides and disulfides. Three carbon dioxide gas samples were tested, one sample per day for three consecutive days, with each sample passing through the iron oxide mix in the same reactor. The sulfur components, other than hydrogen sulfide and mercaptans, were not removed by the iron oxide mix. The hydrogen sulfide ($H_2S$) and mercaptans were removed by about 5 feet of the iron oxide mix, out of a possible 30 feet. Table 10 shows the amount of hydrogen sulfide and mercaptans entering the reactor, as well as the conditions in the reactor vessel. Table 10 also shows the data that was collected and formulated with measurements taken by SENSIDYNE® hydrogen sulfide and total mercaptan stain tubes manufactured by Sensidyne, Inc., and test trailer meters.

TABLE 10

| | Sample 1 | Sample 2 | Sample 3 |
|---|---|---|---|
| Inlet $H_2S$ (ppm) | 25 | 22 | 24 |
| Inlet Mercaptans (ppm) | 20 | 20 | 20 |
| First Port $H_2S$ (ppm) | 0 | 0 | 0 |
| First Port Mercaptans (ppm) | 0 | 0.5 | 0.75 |
| Column 1 Temp (° F.) | 85 | 68 | 84 |
| Column 1 Press (psig) | 410 | 410 | 400 |
| Flow (ft³/hr), actual | 30 | 30 | 30 |

The tested samples revealed that the activated iron oxide mix removed the contaminants with 5 feet of iron oxide mix from the contaminated carbon dioxide streams. Specifically, it should be noted that no contaminants were detected at the second port or 10 foot mark. The tests showed that no hydrogen sulfide ($H_2S$) or mercaptans passed the first 15 feet of the reactor. Thus, the iron oxide mix with an activator was able to remove hydrogen sulfide and mercaptans from water saturated carbon dioxide streams.

Example 9

Two reactor vessels were prepared that were each 15 feet in length, and each reactor vessel contained approximately 30 pounds of iron oxide mix. The iron oxide mix contained about 17.763 pounds of carrier, about 5.7 pounds of water, about 6.45 pounds of iron oxide product, and about 0.087 pounds of copper oxide. The reactor vessel was connected to a carbon dioxide gas well. The carbon dioxide gas was 20% water saturated and was run in the reactor under the following conditions:

Flow Rate (ft³/hr) 30
Temperature (° F.) 70
Pressure (psig) 400
Bed Height (ft) 32
Inlet H₂S (ppm) 25
Inlet Mercaptans (ppm) 20
Inlet Carbonyl Sulfide (ppm) 0.025

The inlet gas contained a number of other sulfur species, in addition to mercaptans, hydrogen sulfide, and carbonyl sulfide, the most abundant sulfur compounds being methyl and ethyl sulfides and disulfides. Three carbon dioxide gas samples were tested, one sample tested per day for three consecutive days, with each sample passing through the iron oxide mix in the same reactor. Hydrogen sulfide and mercaptans were tested for, in addition to carbonyl sulfide. Other sulfur compounds were not removed by the iron oxide mix, nor were they tested for. Table 11 shows the amount of hydrogen sulfide, mercaptans, and carbonyl sulfide entering the reactor, as well as the conditions in the reactor vessel. Table 11 also shows the data that was collected and formulated with measurements taken by SENSIDYNE® hydrogen sulfide and total mercaptan stain tubes manufactured by Sensidyne, Inc., and test trailer meters.

TABLE 11

|  | Sample 1 | Sample 2 | Sample 3 |
|---|---|---|---|
| Inlet H₂S (ppm) | 25 | 22 | 24 |
| Inlet Mercaptans (ppm) | 20 | 20 | 20 |
| Inlet Carbonyl Sulfide (ppm) | 0.025 | 0.025 | 0.025 |
| First Port H₂S (ppm) | 0 | Broke through port 3 (15 ft) | Broke through port 3 (15 ft) |
| First Port Mercaptans (ppm) | 0 | Broke through port 3 (15 ft) | Broke through port 3 (15 ft) |
| First Port Carbonyl Sulfide (ppm) | 0 | Broke through port 2 (10 ft) | Broke through port 3 (15 ft) |
| Column 1 Temp (° F.) | 54 | | |
| Column 1 press (psig) | 410 | | |
| Flow (ft³/hr) actual | 30 | | |

As can be seen, the activated iron oxide product did not remove the sulfur compounds from the water unsaturated carbon dioxide gas as effectively as it did the sulfur compounds from the water saturated carbon dioxide gas. But, the activated iron-oxide product still removed sulfur compounds from the unsaturated carbon dioxide Example 10

To test whether copper metal powder and copper oxide increase the reactivity of iron oxide with sulfur compounds, three (3) towers were set up in a side-by-side arrangement. The three towers were each 6 inches in diameter and 5 feet tall and contained approximately 70 pounds of material reactive with sulfur compounds. The three towers each had an inlet where jet fuel entered the towers. The jet fuel passed into the towers from a common source. An amount of jet fuel stream contaminated with 126 ppm by weight of mercaptans was passed through each of the reactor towers so that three separate streams of jet fuel, in an amount equal to 400 ml/min., was passed through each of the three reactor towers. The jet fuel passed through the reactor towers under atmosphere pressure and a temperature of 80° F. After passage through the reactor towers it was determined at the outlet how much of the mercaptans remained in the jet fuel after passage through the three different reactor towers. The mercaptan levels were determined 48 hours after initiation of the tests, so that the jet fuel passed through the reactor vessels for 48 hours, with a reading then taken at the 48 hour mark.

Reactor No. 1, which was non-activated material, contained 70 pounds of material comprised of 59% by weight of the reactor materials montmorillonite, an amount of iron oxide (Fe₂O₃) equal to 21.75% by weight of the reactor materials, and an amount of water equal to 19.25% by weight of the reactor materials. At the end of 48 hours, it was found that the jet fuel contained an amount of mercaptans equal to 78 ppm by weight, meaning approximately 48 ppm by weight had been removed by the non-activated material.

In the second reactor, the clay, or montmorillonite, and water were added in the same amount as in the first reactor, and the iron oxide was added in an amount equal to 21.25% by weight of the reactor materials. Additionally, an amount of copper powder was added in an amount equal to 0.5% by weight of the reactor materials. It was found that after 48 hours the jet fuel contained approximately 15.8 ppm by weight of mercaptans after passage through the iron oxide activated with copper powder.

In a third reactor, the reactor contents were prepared the same as in the reactor containing the copper metal powder; however, an amount of copper oxide equal to the same amount of copper powder was added thereto. As such, the copper oxide was added in an amount equal to 0.5% by weight of the reactor materials. The mercaptans in the jet fuel were measured after passage through the reactor contents and at the end of 48 hours. It was found that 8.5 ppm by weight of mercaptans remained in the jet fuel after passage through the iron oxide activated with copper oxide.

As can be seen, both the copper metal and the copper oxide provided for suitable removal of sulfur compounds and, in particular, mercaptans from the hydrocarbon stream.

Example 11

A test was conducted to show that zinc oxide could be activated to more readily remove sulfur compounds from fluids than non-activated zinc oxide. As such, two (2) side-by-side tests were conducted to compare activated zinc oxide with non-activated zinc oxide.

The activated zinc oxide was formed by mixing 240 g of inert base, with 80 g of water, 77 g of zinc oxide, and 3 g of cupric oxide. The total weight of the mixture was 400 g. After formation, the activated zinc oxide was placed in a test reactor, which was 1 inch in diameter and 12 inches in length. The activated zinc oxide was placed in the reactor at a depth of 10.5 inches.

A non-activated zinc oxide composition was formed by mixing 240 g of inert base with 80 g of water and 80 g of zinc oxide. Again, the total weight of the mixture was 400 g. The non-activated zinc oxide mixture was then placed in a test reactor having the same dimensions as the test reactor used for the activated zinc oxide, with the non-activated zinc oxide present to the same depth as the activated zinc oxide.

Each of the reactors had an amount of water saturated nitrogen containing 3000 ppm of hydrogen sulfide passed therethrough. The nitrogen gas had a flow rate of 3000 ml/min. through each of the reactor vessels, and the reactor vessels were each at a temperature of 80° F. and a pressure of 3 psig. The nitrogen gas was passed through each of the zinc oxide compositions in the reactor vessels for 3 hours. At the end of the 3 hours, the amount of hydrogen sulfide in the nitrogen gas was measured.

At the outlet of non-activated zinc oxide reactor vessel, 525 ppm of hydrogen sulfide was measured in the treated nitrogen gas. At the outlet of the activated zinc oxide reactor vessel, 0 ppm of hydrogen sulfide was measured in the treated nitrogen gas. As can be seen from these results, the activated zinc oxide demonstrated superior results, with the activated zinc oxide removing a greater amount of hydrogen sulfide than the non-activated zinc oxide.

Example 12

Compressed air was spiked with $H_2S$ resulting in a level of 10 ppm to 25 ppm $H_2S$. The actual amount of $H_2S$ was determined using Kitagawa $H_2S$ detection tubes.

This contaminated air was passed through a 3.75 inch (i.d.) by 1.75 foot bed of media at varying flow rates. The $H_2S$ removal was assessed as a function of contact time with the media.

Two types of media were tested. The first was a mulch product containing iron oxide in an amount equal to about 9% by weight of the total product and $Cu_2O$ in an amount equal to about 0.09% by weight of the total product. The second media was a mulch product containing an amount of iron oxide equal to about 9% by weight of the total product and an amount of $MnO_2$ equal to about 0.09% by weight of the total product. The results as seen in Table 12 and FIG. 4 indicate that the $Cu_2O$ and the $MnO_2$ have similar effects on the iron oxide.

TABLE 12

| Mulch | | Mulch + 9% iron oxide | | | | | |
|---|---|---|---|---|---|---|---|
| | | no additive | | +0.9% $Cu_2O$ | | +0.09% $MnO_2$ | |
| Contact sec. | [$H_2S$] out ppm | Contact sec. | [$H_2S$] out ppm | Contact sec | [$H_2S$] out ppm | Contact sec | [$H_2S$] out ppm |
| 0 | 15 | 0 | 18 | 0 | 24 | 0 | 22 |
| 2.3 | 13 | 1.4 | 16 | 1.6 | 8 | 0.6 | 11 |
| 4.0 | 12 | 2.7 | 11 | 2.7 | 1.8 | 14 | 5.2 |
| 8.1 | 13 | 4.0 | 7 | 4.0 | 0.9 | 2.7 | 4.3 |
| 13.1 | 12 | 8.1 | 2.1 | 5.4 | 1.0 | 8.1 | 1.4 |
| 33.2 | 10 | 16.1 | 0.7 | 8.1 | 1.0 | 16.1 | 0.3 |
| | | | | 16.1 | 0 | | |

Thus, there has been shown and described a novel method and composition for activating oxides reactant with sulfur compounds to remove sulfur compounds from fluids which fulfills all the objects and advantages sought therefore. It is apparent to those skilled in the art, however, that many changes, variations, modifications, and other uses and applications for the subject method and composition are possible, and also such changes, variations, modifications, and other uses and applications which do not depart from the spirit and scope of the invention are deemed to be covered by the invention, which is limited only by the claims which follow.

Reference List

Basic Corrosion Course, National Association of Corrosion Engineers, October 1978.

What is claimed is:

1. A process for the removal of sulfur compounds from fluids, consisting of contacting the sulfur compound contaminated fluid with a composition, which is a physical mixture of iron oxide, iron hydroxide, or combinations thereof, and an activator selected from the group consisting of platinum oxides, gold oxides, silver oxides, copper oxides, copper metals, copper carbonates, copper alloys, copper salts, cadmium oxides, nickel oxides, palladium oxides, lead oxides, mercury oxides, tin oxides, manganese oxides, manganese metals, manganese alloys, manganese carbonates, manganese salts, cobalt oxides, and combinations thereof, wherein the activator is present in the composition in an amount of 0.125% by weight to 5% by weight of the total weight of the composition, and said contacting is conducted at a temperature of 300° C. or less.

2. A process for the removal of sulfur compounds from fluids, consisting of contacting the sulfur contaminated fluid with a composition, which is a physical mixture of iron oxide, iron hydroxide, zinc oxide, zinc hydroxide, or combinations thereof, and an activator selected from the group consisting of copper oxides, copper metals, copper carbonates, copper alloys, copper salts, manganese oxides, manganese metals, manganese alloys, manganese carbonates, manganese salts, and combinations thereof, wherein the activator is present in the composition in an amount of 0.125% by weight to 2% by weight of the total weight of the composition, and said contacting is conducted at a temperature of 300° C. or less.

3. A process for the removal of sulfur compounds from fluids, consisting of contacting the sulfur compound contaminated fluid with a composition, which is a physical mixture of manganese oxide, manganese hydroxide, or combinations thereof, and an activator, with said activator selected from the group consisting of platinum oxides, gold oxides, silver oxides, copper oxides, copper metals, copper carbonates, copper alloys, copper salts, cadmium oxides, nickel oxides, palladium oxides, lead oxides, mercury oxides, tin oxides, cobalt oxides, and combinations thereof, wherein the activator is present in the composition in an amount of 0.125% by weight to 5% by weight of the total weight of the composition, and said contacting is conducted at a temperature of 300° C. or less.

* * * * *